US009457983B2

(12) United States Patent
Himmelsbach

(10) Patent No.: US 9,457,983 B2
(45) Date of Patent: Oct. 4, 2016

(54) DISPENSER

(71) Applicant: tesa SE, Hamburg (DE)

(72) Inventor: Peter Himmelsbach, Buxtehude (DE)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 14/349,218

(22) PCT Filed: Oct. 1, 2012

(86) PCT No.: PCT/EP2012/069347

§ 371 (c)(1),
(2) Date: Apr. 2, 2014

(87) PCT Pub. No.: WO2013/053613

PCT Pub. Date: Apr. 18, 2013

(65) Prior Publication Data

US 2014/0252021 A1 Sep. 11, 2014

(30) Foreign Application Priority Data

Oct. 12, 2011 (DE) ........................ 10 2011 084 327
Mar. 22, 2012 (DE) ........................ 10 2012 204 594

(51) Int. Cl.
*B29C 65/00* (2006.01)
*B41J 11/00* (2006.01)
(Continued)

(52) U.S. Cl.
CPC ............. *B65H 35/0086* (2013.01); *B41J 3/24* (2013.01); *B41J 3/36* (2013.01); *B41J 3/39* (2013.01);
(Continued)

(58) Field of Classification Search
CPC ............ B65H 37/005; B65H 35/0033; B65H 35/0086; B65C 11/02; B41J 3/4075; B41J 3/24; B41J 3/36; B41J 29/023; B41J 3/39; B41J 11/703; B42J 3/24
See application file for complete search history.

(56) References Cited

U.S. PATENT DOCUMENTS 3,533,616 A * 10/1970 Bettenhausen .... B65H 35/0026 493/338
5,068,004 A 11/1991 Moll
(Continued)

FOREIGN PATENT DOCUMENTS

DE 3819845 A1 2/1990
DE 10254288 A1 6/2004
(Continued)

OTHER PUBLICATIONS

English-language Translation of International Search Report for PCT Application No. PCT/EP2012/069347 dated Jan. 11, 2013.
(Continued)

*Primary Examiner* — Alex Efta
(74) *Attorney, Agent, or Firm* — Norris McLaughlin & Marcus, P.A.

(57) ABSTRACT

A dispenser dispenses portions of a roll of a double-sided sticky adhesive tape where at least one sticky side is covered by a liner. The dispenser has (i) an optional handle, (ii) a feed of the adhesive tape, mounted on a frame of the dispenser, to a first cutting apparatus A, (iii) a first cutting apparatus A, configured such that by way of the cutting operation the adhesive tape is severed at a point by the cutting apparatus without the liner being severed at the same time such that the adhesive tape is weakened such that the adhesive tape is able to be severed at the point, (iv) a second cutting apparatus B, configured such that by way of the cutting operation the adhesive tape and the liner are completely severed by the cutting apparatus, is mounted downstream of the first cutting apparatus with reference to the guiding of the adhesive tape from the roll of the adhesive tape, and (v) an application device by way of which the adhesive tape is pressed on the support and which comprises a rotatably mounted roller.

18 Claims, 8 Drawing Sheets

(51) Int. Cl.

| | |
|---|---|
| ***B26D 5/08*** | (2006.01) |
| ***B26D 3/00*** | (2006.01) |
| ***B65H 35/00*** | (2006.01) |
| ***B41J 3/24*** | (2006.01) |
| ***B41J 3/39*** | (2006.01) |
| ***B41J 3/407*** | (2006.01) |
| ***B41J 3/36*** | (2006.01) |
| ***B65H 37/00*** | (2006.01) |
| *B41J 11/70* | (2006.01) |

(52) U.S. Cl.

CPC ......... *B41J 3/4075* (2013.01); *B65H 35/0033* (2013.01); *B65H 37/005* (2013.01); *B41J 11/703* (2013.01)

(56) References Cited

U.S. PATENT DOCUMENTS

| | | | | | |
|---|---|---|---|---|---|
| 5,069,732 | A | * | 12/1991 | Levine ...................... | B65C 9/30<br>100/211 |
| 5,458,423 | A | * | 10/1995 | Sims ...................... | B41J 3/4075<br>400/621 |
| 5,486,389 | A | * | 1/1996 | Gerber ...................... | C09J 7/02<br>206/411 |
| 5,492,420 | A | * | 2/1996 | Nunokawa ............ | B41J 3/4075<br>358/1.2 |
| 5,556,213 | A | * | 9/1996 | Kudo ..................... | B26D 3/085<br>156/268 |
| 6,045,276 | A | * | 4/2000 | Matsuhashi .............. | B41J 2/325<br>400/613 |
| 6,113,294 | A | * | 9/2000 | Niwa ...................... | B41J 3/407<br>400/613 |
| 6,142,688 | A | * | 11/2000 | Saito ...................... | B26D 1/305<br>400/621 |
| 6,705,784 | B2 | * | 3/2004 | Furuya et al. ................ | 400/621 |
| 2005/0056378 | A1 | | 3/2005 | Schwertfeger | |
| 2009/0032193 | A1 | * | 2/2009 | Fukui ......................... | B41J 3/50<br>156/350 |

FOREIGN PATENT DOCUMENTS

| | | | |
|---|---|---|---|
| DE | 102009010045 | A1 | 9/2010 |
| DE | 102010039299 | A1 | 2/2012 |
| EP | 2048102 | A2 | 4/2009 |
| FR | 2813873 | A1 | 3/2002 |
| JP | S5182996 | A | 7/1976 |
| JP | H0333857 | U | 4/1991 |
| JP | 10218469 | A | 8/1998 |

OTHER PUBLICATIONS

German Office Action for corresponding German Application No. 10 2012 204 594.5 dated Sep. 12, 2012.

Satas, Donatas; "Handbook of Pressure Sensitive Adhesive Technology", 1999, pp. 1-438; Satas & Associates; Warwick, Rhode Island, United States of America.

* cited by examiner

DISPENSER

This application is a 371 application of PCT/EP2012/069347 filed Oct. 1, 2012, which claims foreign priority benefit under 35 U.S.C. §119 of German Application Nos. DE 10 2011 084 327.2 filed Oct. 12, 2011 and DE 10 2012 204 594.5 filed Mar. 22, 2012.

FIELD OF THE DISCLOSURE

The present invention relates to a dispenser by way of which a strip of a double-sided sticky adhesive tape which is covered by a liner is able to be dispensed in such a manner that a tab formed from the liner is able to be created on the strip of adhesive tape.

BACKGROUND OF THE DISCLOSURE

Adhesive tapes which are coated on one or both sides with adhesives are wound onto a core (of plastics material or paperboard) in the majority of cases to form a roll in the form of a spiral of Archimedes at the end of the manufacturing process. In order to prevent the pressure-sensitive glues coming into contact with one another in the case of double-sided sticky adhesive tapes, or in order to prevent the pressure-sensitive glue bonding to the carrier in the case of one-sided sticky adhesive tapes, prior to winding the adhesive tapes are applied onto a cover material (also called anti-adhesive material) which is rolled up together with the adhesive tape. Such types of cover materials are known to the expert under the names of release liners or liners.

A liner (anti-adhesive paper, anti-adhesive foil) is not a component part of an adhesive tape, but only an aid to the manufacture, storage or for further processing thereof by means of punching. Over and above this, a liner, unlike an adhesive tape carrier, is not fixedly connected to an adhesive layer.

Double-sided adhesive tapes are used in various areas. Let us mention as an example the bonding of (plastics) components such as screens to automobile bodies.

To this end, the components are provided with the adhesive tape at their place of manufacture whilst the liner, as a rule, remains on the component until the component is to be bonded to the vehicle on the production line of the vehicle manufacturer. The liner is not removed until directly before it is used in the construction or occasionally after the pre-assembly.

The ability to work with the liner always poses a serious problem. Usually the liner closes off flush with the strip of adhesive tape, that means that there is no piece of liner protruding by way of which the liner can be gripped and comfortably removed. On the contrary, as a result of the liner and the adhesive tape strip coinciding, it is often very difficult and consequently very time-consuming to detach the liner at at least one position of the adhesive tape strip.

Nowadays, with current production speeds, this is no longer accepted.

The adhesive tape manufacturer is expected to provide a strip of adhesive tape which is covered by a liner, from which it is possible to remove the liner in an easy and speedy manner.

First solutions have been developed in order to enable the user to grip the liner better.

For example, the liner itself can comprise a lateral protrusion as a result of having a larger width than the adhesive tape. Tabs can then be stuck or soldered onto the liner.

The known solutions, however, are disadvantageous.

A laterally protruding liner always signifies excessive liner material which is actually to be seen as wastefulness and which incurs higher (material) costs. In addition, adhesive tapes with protruding liners are clearly more difficult to work with during the production process. When in the production process said liner over and above this first replaces the preceding liner which has the same width as the adhesive tape, a further and consequently unwanted production step is necessary.

The bonding or soldering on of a tab includes a further and consequently naturally unwanted operating step. The additional tabs are also expensive and a precise check is required to see which tab is a technical match for which liner. In order to be able to detach liners from the glue again, it must be designed to be anti-adhesive. The result of this is that only certain glues, with which the tab to be put on is provided, bond securely on the liner. A different liner in the majority of cases requires a different tab with a modified glue, i.e. flexibility during the bonding or soldering of tabs is restricted. In addition, production fluctuations can lead to problems in the sensitive system.

The application of the adhesive tape onto the said component can be effected by hand, using manual applicators or using fully automatic apparatuses. A selection of the most favorable methods is made depending on the quantity, scope of the adhesion and the framework parameters.

Full automation is profitable as a rule in the case of larger volumes and in particular in countries with high wage costs. It certainly almost always requires large investment sums, but is quick and precise. In countries with low wage costs and/or in the case of small annual quantities, adhesion, as a rule, is usually by hand or manual applicators are used.

Manual applicators are used wherever a higher degree of application precision is required. In the majority of cases, the applicators have an incorporated cutting apparatus which—manually triggered—cuts through the adhesive tape and cuts it into lengths from the roll. A scissors cut with two cutters is used, as a rule, for adhesive tapes which are very thick.

If the applied adhesive tape is to have a freely cut liner protrusion, this can be created subsequently by hand with a cutter after dispensing the strip of adhesive tape by a piece of the adhesive tape of the strip of adhesive tape being detached by the cutter, without at the same time cutting through the liner, and being removed. In this connection, there is always a risk of injury and the risk that the liner is cut through.

In addition, this is time-consuming as different tools have to be picked up.

SUMMARY OF THE DISCLOSURE

It is the object of the present invention to provide a dispenser by way of which a strip of a double-sided sticky adhesive tape which is covered by a liner can be dispensed and at the same time an easily grippable tab can be created with the liner of the adhesive tape, said tab being low in weight and consisting of as few components as possible.

Said object is achieved by a dispenser, as is explained in the main claim, further developments of the dispenser according to the invention, in this case, are the object of the sub-claims.

Accordingly, the invention describes a dispenser for dispensing portions of a double-sided sticky adhesive tape where at least one sticky side is covered by a liner, said dispenser comprising where applicable, a handle which is mounted on a frame, a feed of the adhesive tape, mounted on the frame, to a first cutting apparatus A, a first cutting apparatus A which is developed in such a manner that by way of the cutting operation the adhesive tape is severed by the cutting apparatus without the liner being severed at the same time such that the adhesive tape is weakened in such manner that said adhesive tape is able to be severed at this point, a second cutting apparatus B, which is developed in such a manner that by way of the cutting operation the adhesive tape and the liner are completely severed by the cutting apparatus and which is mounted downstream of the first cutting apparatus with reference to the guiding of the adhesive tape from the roll of the adhesive tape and an application device by way of which the adhesive tape is pressed on the support and which consists, in particular, of a rotatably mounted roller.

In a preferred embodiment, the first cutting apparatus A and/or the second cutting apparatus B comprise a movable cutter which is advantageously developed in a razor-blade-like manner. This type of cutter is developed and marketed by Martor KG in Solingen. In a further preferred manner, both cutting apparatuses A and B have a movable cutter.

Further preferably, the first cutting apparatus A and/or the second cutting apparatus B consist of a movable cutter and a rotatably mounted cutting roller. The adhesive tape is guided between the cutter and the cutting roller which forms the hard support on which the adhesive tape, and where applicable additionally the liner, are severed as a result of moving the cutter to them. Here too, in an advantageous variant, the first cutting apparatus A and the second cutting apparatus B consist of a movable cutter and a rotatably mounted cutting roller. The diameter of the cutting roller is preferably between 3 mm and 50 mm, in a particularly proffered manner between 4 and 26 mm and even more preferred between 5 and 20 mm.

The first cutting apparatus A and/or the second cutting apparatus B can also consist of a movable cutter, again preferably in the form of a single-cutting razor blade, and a fixedly mounted support surface for example in the form of a cutting bed which comprises a fixed surface, by means of which the adhesive tape is guided and which forms the hard support on which the adhesive tape, and where applicable additionally the liner, is severed by moving the cutter to it.

Further preferably, the cutting bed comprises lateral webs between which the adhesive tape is guided and which preferably comprise a width of between 0.1 mm and 3 mm and further preferably a width of between 0.2 mm and 2 mm.

In a further design, only the first cutting apparatus A is movable, the cutting apparatus B is then a tear-off blade which does not have to be movable.

The width of the cutting apparatuses, as a rule, is adapted to the width of the adhesive tape. In principle, however, the cutting apparatus can also be wider than the adhesive tape. Cutting apparatuses with a width of between 2 and 30 mm are advantageous.

In the first cutting apparatus, when the cutting operation is triggered, the adhesive tape is severed by the cutting apparatus, preferably by means of a cutter, without the liner being severed at the same time.

The adhesive tape is consequently weakened in such a manner that it can be easily severed at said point (the open, contacting glue faces tend to flow together again such that—depending of the characteristic of the glues—a small amount of force is necessary to separate them again).

The length of the portion of adhesive tape between the first cutting apparatus A and the second cutting apparatus B corresponds to the length of the tab which is formed in that, after the desired length of adhesive tape has been dispensed, the strip of the adhesive tape between the first end of the dispensed adhesive tape and the cut created by the first cutting apparatus is removed, whilst the liner situated over said strip of adhesive tape which is not severed in the first cutting apparatus, is not removed and consequently forms the desired tab. The adhesive tape can now be easily covered by said liner portion which forms the tab being taken and the entire liner being removed from the adhesive tape.

As mentioned, the length of the portion of adhesive tape between the first cutting apparatus and the second cutting apparatus determines the length of the tab. In a preferred manner, consequently, at least the position of the second cutting apparatus on the frame can be modified in order to vary the length of the tab. In addition, the adhesive tape can also be conveyed forward or backward after the first cutting operation, but before the second cutting operation such that the spacings are able to be varied in a very flexible manner.

The length of the tab is at least 3 mm, preferably between 5 and 100 mm and in a particularly preferred manner between 5 and 50 mm.

Further preferably, a mechanism, which, when actuated, transfers the cutters of the first cutting apparatus A and/or second cutting apparatus B into the cutting operation, is provided on the handle.

This can, for example, be a knob provided in the handle which is guided into the handle when actuated and by means of a corresponding mechanical or pneumatic system (for example a linkage, a Bowden cable or a pneumatic hose system) ensures that the cutters are moved forward.

The cutters of the first and second cutting apparatus can preferably be moved independently of one another, which is to be brought about, for example, by a second mechanism.

When the first cutting apparatus A is moved independently of the second cutting apparatus which completely severs the adhesive tape and the liner, a tab can be created at both edge regions on the strip of adhesive tape to be dispensed.

At the start of the dispensing operation of the strip of adhesive tape, the first cutting apparatus A is activated, whereby the first tab region is created. Prior to completion of the dispensing operation, the first cutting apparatus A cuts through the adhesive tape another time. The dispensing operation is then continued so far (the non-severed liner makes possible the continued dispensing operation of the adhesive tape), until said cut region is also dispensed on the support. Only then is the second cutting apparatus B actuated in order to sever the adhesive tape and the liner completely.

In another embodiment of the invention, the cutting blades are arranged in a rigid manner and the counter plate(s) and roller(s) are movable. In this connection, the counter pressure is built up by means of simple mechanics known to the expert.

The cutting apparatuses A and B can be limited in their travel for safer processing such that they always leave a small gap to the counter plate(s) and/or the roll(s). This is selectable in a variable manner by means of an adjustment screw in an adjustment block.

In a preferred manner, adjustment possibilities are between 20 and 300 μm.

When there is a cutting bed with lateral webs, between which the adhesive tape is guided, the webs and the cutter can also be realized such that the cutter rests on the web or the webs.

Cutting through the liner is consequently avoided.

In a particularly special design, the cutting blade contacts an uneven cutting bed, also called a counter plate, or a cutting roller, also called a counter roll. FIGS. 1A, 1B and 1C show a particularly advantageously developed embodiment in the form of a counter roll 21 with radially circumferential webs 21*a*, between which radially circumferential grooves 21*b* are also situated. The webs are arranged lying very close together such that 20% to 80% of the roll can have blade contact (or 20% to 80% of the cutting bed in an embodiment with a cutting bed).

In a surprising manner, it is shown that nevertheless the liner remains uninjured during cutting.

FIG. 1A shows a top view of such a counter roll 21, FIG. 1B shows it in a section according to the axis A-A. FIG. 1C shows the preferred dimensions of the webs 21*a* and grooves 21*b* in detail.

The web width is usually chosen between 0.1 mm and 3 mm, in a preferred manner between 0.2 mm and 2 mm and in a particularly preferred manner between 0.3 mm and 1.5 mm. The gap width is usually chosen between 0.1 mm and 2 mm and in a particularly preferred manner between 0.2 mm and 1.0 mm. In a further design, the arrangement can extend in a helical manner, or webs and widths are not width-constant, but vary in their width.

The diameter of the counter roll 21 is preferably between 5 mm and 50 mm. A support and bearing arrangement on both sides is advantageous.

Combinations of the previously mentioned adjustment possibilities are even more advantageous and consequently even more preferred.

In a preferred manner, a double-sided sticky adhesive tape situated on a roll, where at least one sticky side is covered by a liner, is dispensed using the dispenser.

A receiving means which is rotatably mounted on the frame is advantageously situated for this purpose.

In a further advantageous manner, there is present a rotatably mounted draw-off roller which is wrapped around at least in part by the adhesive tape and by means of which the adhesive tape is removed from the roll.

Where applicable, in order to build up the necessary tension in the adhesive tape, downstream of the advantageously provided draw-off roller and upstream of the first cutting apparatus a further guide roller can be provided, preferably of rubber or with a rubber coating or with an otherwise anti-adhesive provision, which is partially wrapped around by the adhesive tape.

The apparatus can be provided with a brake which, in the simplest case, is a 1 mm thick cork disk which presses onto a fixed component such as the frame by means of an adjusting screw. The advantage of the guide roller is that the adhesive tape including the liner can be guided in a targeted manner into the first cutting apparatus irrespective of the diameter of the adhesive tape roll which becomes continuously smaller as it unrolls.

The surface of the application device, preferably the rotatably mounted roller, can be provided with a foam material coating.

For the case where a portion of the adhesive tape is to be applied on an edge or on a design transfer of a component at a predefined and constant spacing, a corresponding apparatus is provided on the application device by way of which the application device is able to be modified in its transversal position.

Said apparatus can be, for example, a circumferential, disk-shaped extension on one of the lateral edges of the application roller or a sliding system which is adjustable, for example, in its lateral position by means of a corresponding control wheel and by means of which the adhesive tape is guided and at the same time is dispensed on the support.

When the dispenser is guided along on the edge by way of the application device, the lateral disk, for example, which abuts against the edge, ensures that the adhesive tape can be dispensed in an extremely precise manner at a constant spacing on the edge.

The handle as well as all other components can be mounted in a mirror-inverted manner on the frame in order to enable simple use of the dispenser for both left-handed and also right-handed users. The devices can also be realized as push or pull devices.

In particular in order to prevent the receiving roll for the adhesive tape following in an uncontrolled manner during the dispensing operation, there is an adjustable brake, in particular a friction brake, in the receiving means for the roll of adhesive tape. Said brake additionally ensures that the tension is even and not too low in the path of the adhesive tape during the dispensing operation.

In addition, a handle or a lever, by way of which the dispenser (that is, in particular, the application device in the form of a roller) can be pressed fixedly onto the support, can be provided on the dispenser for the second hand of the user.

Devices which can be operated by hand are advantageous. It is shown here that said devices should have a mass of less than 2000 g, in a preferred manner between 400 g and 1200 g and in a particularly preferred manner between 600 g and 1000 g.

This is why they are produced from aluminum or from a combination product of aluminum and a polymerization product.

Plastics materials are suitable as materials for the dispenser and for as many of the components as possible, but a metal construction, in a preferred manner aluminum, is also possible or combinations thereof.

In particular, the base plate should have both a corresponding rigidity and be easy to modify. Aluminum plates are advantageous for all the components with a thickness of between 3 m and 6 mm. In addition, reinforced plastics materials can be used for special applications. In this case aluminum/polymer combinations such as aluminum with PC or aluminum with POM are favorable.

Rollers with a rubber coating with a Shore hardness A of between 30 and 90 are proven to be advantageous.

According to DIN 53505 (1987-06), the Shore hardness when testing elastomers, rubber and caoutchouc corresponds to the resistance against the penetration of a truncated cone (A or C) or a rounded cone (D) which is measured by compressing a spring with a fixed spring characteristic and is expressed in non-dimensional Shore-A (C, D) hardness units. When testing steel, the Shore resilience hardness is measured in the so-called scleroscope where the rebound of a drop-weight, which falls onto the testing surface in a vertical pipe, is determined.

Rubber, polyurethane, silicon, foam and CFK rollers can be selected according to requirements. The thickness of the foam is preferably between 0.2 mm and 6 mm.

The covering of the pressure roller can consist of O-ring seals. In this case, rings with a diameter of 0.3 mm or 1.0 mm have been used. Occasionally foam materials are also advantageous.

Finally, the invention also includes dispensers according to the invention with an adhesive tape which is situated on a roll and is, in particular, sticky on one side, where at least one sticky side is covered by a liner.

The dispensers according to the invention are suitable for unwinding a multitude of adhesive tapes which are situated on a roll and are, in particular, sticky on one side, which are covered at least on one side by a liner.

Paper, a paper-polyolefin bond and/or a foil are preferably used as the carrier for the adhesive tape.

In addition, in principle, foils such as, for example, BOPP or MOPP, PET, PVC or non-woven fabric (on a cellulose or polymer base) are suitable as carriers, in particular PUR. In addition, foam materials (for example PUR, PE, PE/EVA, EPDM, PP, PE, silicon, etc.) can also be used.

All pressure-sensitive glues, such as, for example, mentioned in SATAS, Handbook of Pressure Sensitive Adhesive Technology, Third Edition, can be used as glues for the adhesive tapes. In particular, natural/synthetic caoutchouc and acrylic-based glues which can be applied from the melt or solution are suitable.

All specifications of measured values are mean values, said mean values having a maximum scatter of four a about the mean value. Each measurement was carried out after 24 h conditioning in the climatic chamber (23±1° C.; 50%±5% rel. humidity).

Ten measurements were carried out.

The widths were determined using a steel rule and a vernier caliper and the mass by means of beam scales and parcel scales. No statistical deviations restricting the invention were ascertained.

A particularly advantageous embodiment of the dispenser is described in more detail by way of the figures described below without thereby intending to restrict the invention unnecessarily, in which:

DETAILED DESCRIPTION OF THE DISCLOSURE

Figure 1A:
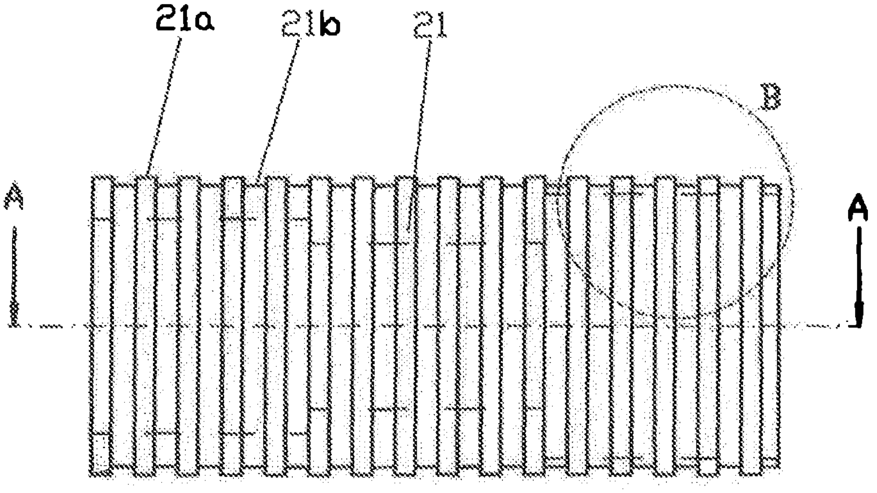
FIGS. 1A, 1B and 1C show a particularly advantageous variant of the cutting roller which has already been described above in detail.
Figure 1B:
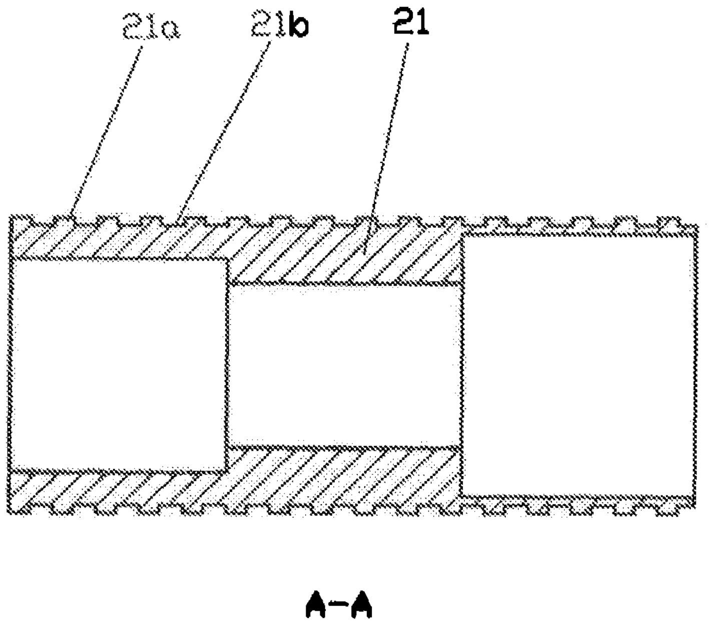
Figure 1C:
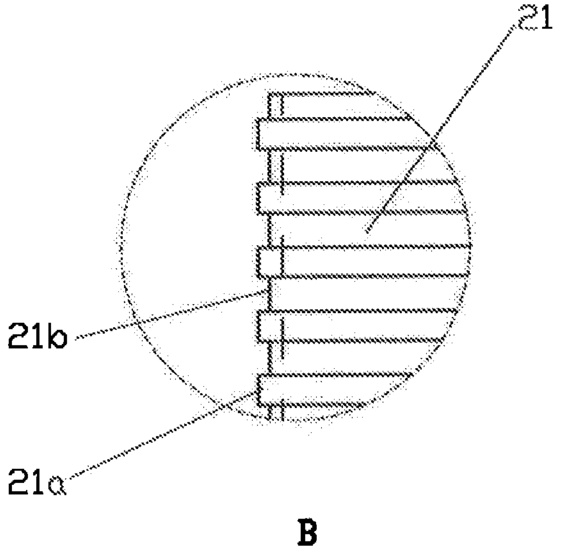
Figure 2:
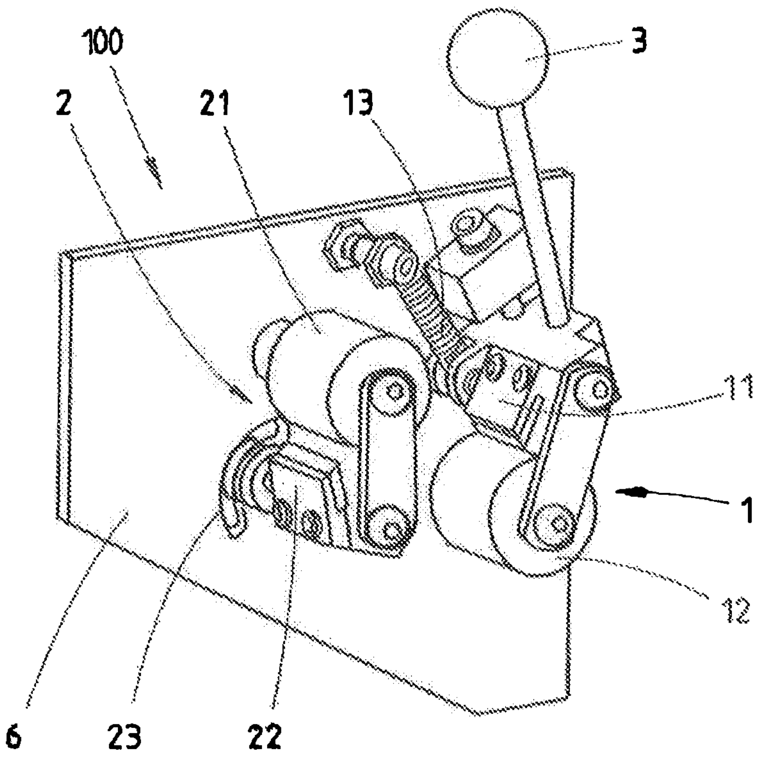
FIG. 2 shows the frame of the dispenser with the two cutting apparatuses A and B.

FIG. 2 shows a detail of the frame 6 on which the first cutting apparatus A1 and the second cutting apparatus B2 are present.

The first cutting apparatus A1 consists of a razor-blade-like cutter 11 and an associated cutting roller 12. The cutter 11 mounted on an axis in such a manner that by pressing the lever 3 in the direction of the second cutting apparatus 2, the cutter 11 guided in an arcuate movement onto the roller 12 and would sever the adhesive tape (not shown here) together with the liner. The lever 3 is pulled back into its initial position again by means of a helical spring 13.

The second cutting apparatus 2 consists of a razor-blade-like cutter 22 and an associated cutting roller 21. The cutter 22 is also mounted in such a manner on an axis which is guided in the groove 23 that by pressing the lever 3 in the direction of the second cutting apparatus 2 the cutter 22 is guided in an arcuate movement onto the roller 21—in contrast with the first cutting apparatus 1—would sever the adhesive tape without at the same time damaging the liner, as a result of which a tab of the length of the spacing between the first cutting apparatus 1 and the second cutting apparatus 2 would be created.

The adhesive tape including the liner, coming from the right, would be guided by means of the first roller 12, by means of the second roller 22 and forwarded to the left to the dispensing location.

The roll which faces the sticky side of the adhesive tape can be provided with an anti-adhesion coating under the name of PlasmaCoat 30502/4001 F produced by Impreglon, Lüneburg.

The first cutting apparatus A1 and the second cutting apparatus B2 can also be realized such that the first cutting apparatus A1 would only sever the adhesive tape, that is without damaging the liner, whilst the second cutting apparatus B2 cuts through both the liner and the adhesive tape.

Figure 3:
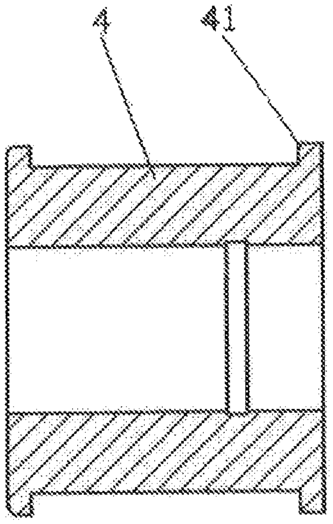
FIG. 3 shows an application device in the form of a rotatably mounted roller.

FIG. 3 shows the preferred embodiment of the application device, namely a rotatably mounted roller 4, by way of which the adhesive tape is pressed on the support. To guide the adhesive tape cleanly, the roller 4 comprises a circumferential web 41 on each edge such that the roller 4 has a sleeve-like cross section.

The base body of the roller 4 is produced from an aluminum alloy. The contact surface of the roller 4 is provided with a 2 mm foam, for example type AG, Solothurn, CH, 31×36×16 mm (product 0-9000).

Figure 4:
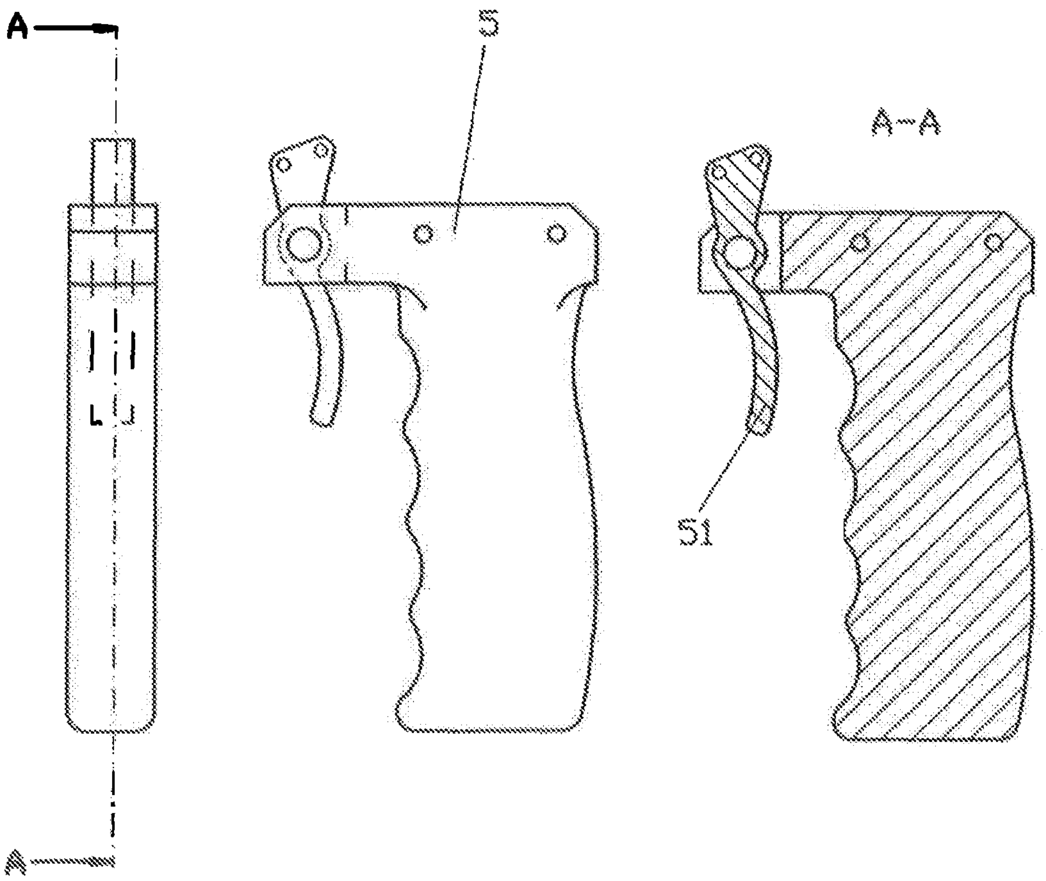
FIG. 4 shows a handle of the dispenser.

FIG. 4 shows a handle 5 which is fastened on the frame 6 of the dispenser 100. The handle 5 is shown in two perspectives, in addition in a side section according to the line A-A.

A finger lever 51 which serves to trigger the first and/or second cutting apparatus 1 and 2 is on the handle 5. The finger lever 51 can be connected mechanically to the first cutting apparatus 1 and/or to the second cutting apparatus 2 by means of a linkage or in a pneumatic manner such that a cutting operation is triggered when said finger lever is actuated.

Figure 5:
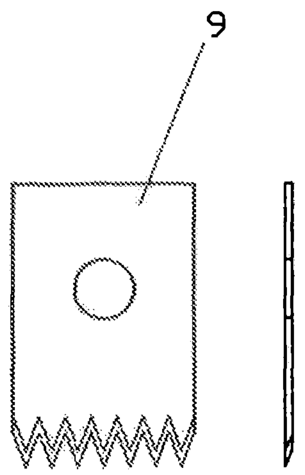
FIG. 5 shows a cutter, as on the dispenser according to the invention

FIG. 5 shows a usual toothed blade 9 for severing the adhesive tape and the liner together.

Figure 6:
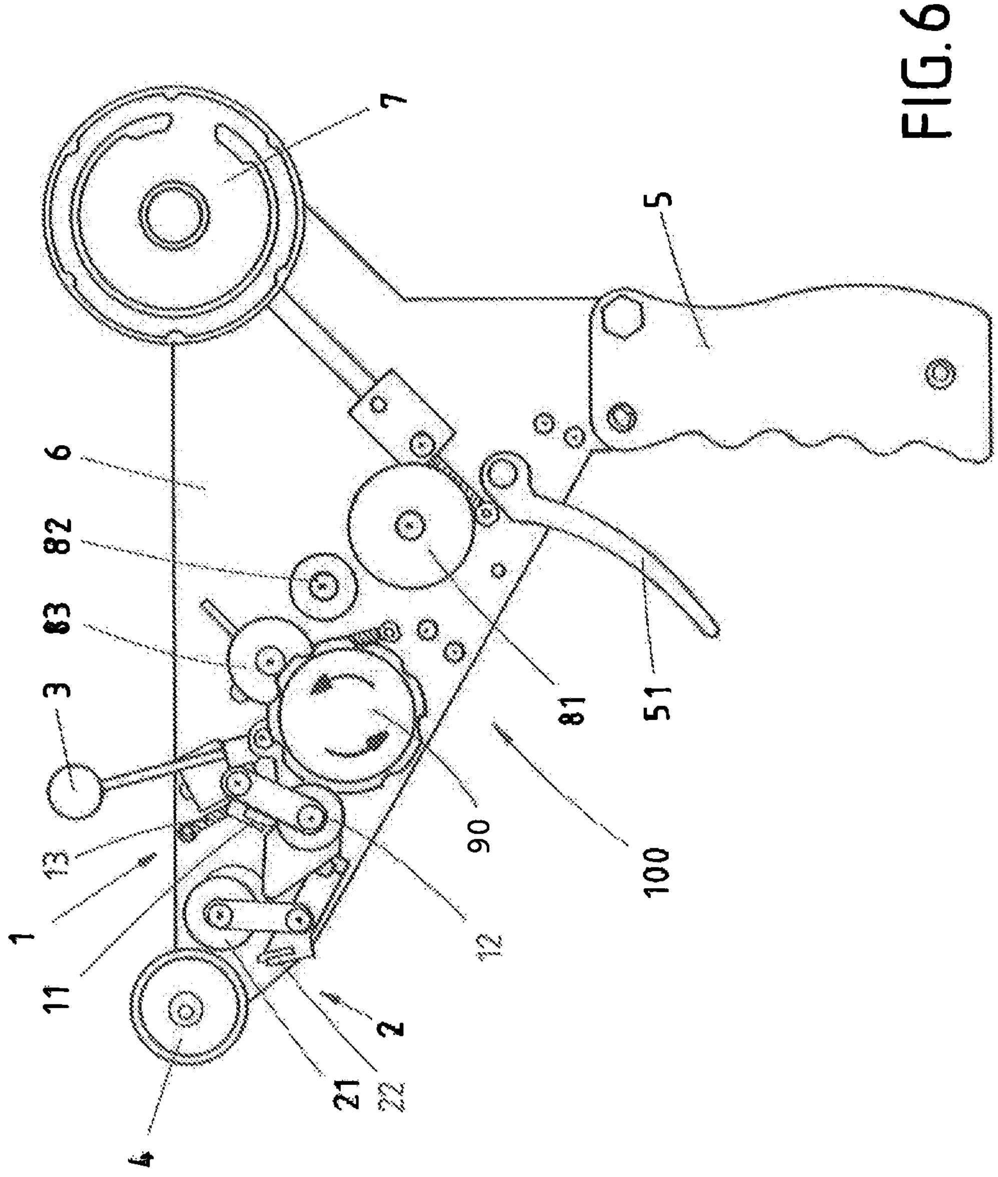
FIG. 6 shows a preferred embodiment of the dispenser.

FIG. 6 shows a preferred embodiment of the whole dispenser 100.

The dispenser 100 serves for receiving a double-sided sticky adhesive tape which is situated on a roll, where at least one sticky side is covered by an anti-adhesive paper.

The roll of adhesive tape is situated on a receiving means 7 for the roll of adhesive tape which is rotatably mounted on a metal frame 6.

In addition, a handle 5 is mounted on the frame 6. Said handle serves for holding and guiding the dispenser 100. A finger lever 51 which serves for triggering the first and second cutting apparatus 1 and 2 is provided on the handle 5. The finger lever is connected to the first and second cutting apparatus 1 and 2 in a mechanical manner for this purpose by means of a linkage (not shown).

The adhesive tape together with the liner is guided by means of several guide rollers 81, 82, 83 in the direction of the first cutting apparatus A1.

The first cutting apparatus A1 consists of a razor-blade-like cutter 11 and an associated cutting roller 12. The cutter 11 is mounted on an axis in such a manner that by pressing the lever 3 in the direction of the second cutting apparatus 2 the cutter 11 is guided in an arcuate movement onto the roller 12 and would sever the adhesive tape (not shown here) together with the liner. The lever 3 is pulled back into its initial position again by means of a helical spring 13.

The second cutting apparatus 2 consists of a razor-blade-like cutter 22 and an associated cutting roller 21. The cutter 22 is also mounted in such a manner on an axis, which is guided in the groove 23, that by pressing the lever 3 in the direction of the second cutting apparatus 2 the cutter 22 is guided in an arcuate movement onto the roller 21 and—in contrast to the first cutting apparatus 1—would sever the adhesive tape without at the same time damaging the liner, as a result of which a tab of the length of the spacing between the first cutting apparatus 1 and the second cutting apparatus 2 would be created.

The application device consists of the rotatably mounted roller 4 (hereinafter "the roller 4") which presses the portion of adhesive tape onto the support.

In addition, the roller 4 forms a gap with the guide roller 83, through which the adhesive tape is guided. The roller can be made to rotate by hand by means of the rotary wheel 90. After the dispensing operation the roller 4 is rotated, as a result of which the adhesive tape is forwarded in the gap produced by the roller 4 and the guide roller 83 until it can be gripped by hand and guided through the cutting apparatuses 1 and 2 to the contact roller 4.

The roll with the adhesive tape provided with a liner is placed onto the receiving means and the end is pulled off. The bottom side of the first guide roller 81 is wrapped around by the adhesive tape. The adhesive tape is then guided further in the direction of the second guide roller 82, wraps around said roller 82 at an angle of approximately 90° and is then guided through the gap produced by the roller 4 and the third guide roller 83 through the cutting apparatuses 1 and 2 to the roller 4.

In one variant of the dispenser, the cutting apparatuses 1 and 2 and set up in such a manner that the first cutting apparatus A1 would only sever the adhesive tape, that is without damaging the liner, whilst the second cutting apparatus B2 cuts through both the liner and the adhesive tape.

The invention claimed is:

1. A dispenser for dispensing portions of a roll of a double-sided sticky adhesive tape, having at least one sticky side covered by a liner, the dispenser comprising:

a frame having an upper edge and a bottom edge when the frame is located in an upright position;

a handle having a length defined between a first end and a second end located opposite to the first end of the handle, wherein the first end of the handle is fastened to the bottom edge of the frame, wherein the second end of the handle extends outwardly away from the bottom edge of the frame;

a movable lever connected to the frame;

a first cutting apparatus connected to the frame and configured such that, by way of a first cutting operation via moving the movable lever, the adhesive tape is weakened at a first point such that the adhesive tape is severable at the first point;

a second cutting apparatus connected to the frame and configured such that, by way of a second cutting operation via moving the movable lever, the adhesive tape and the liner are completely severed at a second point by the second cutting apparatus, wherein the second cutting apparatus is mounted downstream of the first cutting apparatus with reference to a guiding of the adhesive tape from the roll of the adhesive tape;

an application device by way of which the adhesive tape is pressed on a support, wherein the application device consists of a rotatably mounted roller; and a rotary wheel for rotating the application device by hand, wherein the handle comprises a front side located adjacent to the first cutting apparatus, wherein the front side of the handle comprises convex surfaces alternating between concave surfaces and the convex and concave surfaces are formed in the handle of the dispenser between the first end and the second end of the handle, and further wherein, when the dispenser is located in an upright position, the first cutting apparatus and the second cutting apparatus are located between the rotary wheel and the application device.

2. The dispenser according to claim 1, wherein at least one of the first cutting apparatus and the second cutting apparatus comprises a movable cutter.

3. The dispenser according to claim 1, wherein at least one of the first cutting apparatus and the second cutting apparatus consists of a movable cutter and a rotatably mounted cutting roller, by means of the which the adhesive tape is guidable and which forms a support on which the adhesive tape is severable as a result of moving the movable cutter to it.

4. The dispenser according to claim 1, wherein at least one of the first cutting apparatus and the second cutting apparatus consists of a movable cutter and a cutting bed which comprises a fixed surface by means of which the adhesive tape is guided and which forms a support on which the adhesive tape is severable as a result of moving the movable cutter to it.

5. The dispenser according to claim 4, wherein the cutting bed comprises lateral webs between which the adhesive tape is guided and the webs comprise a width of between 0.1 mm and 3 mm.

6. The dispenser according to claim 3, wherein cutters of the first and second cutting apparatus are movable independently of one another.

7. The dispenser according to claim 3, wherein a finger lever, which, when actuated, transfers the cutters of the first and/or second cutting apparatus into the cutting operation, is provided on the handle.

8. The dispenser according to claim 1, wherein at least a position of the second cutting apparatus on the frame is movable to vary a length of a resulting tab.

9. The dispenser according to claim 1, wherein the adhesive tape is situated on a receiving means, which is rotatably mounted on the frame, in the form of a roll, where at least one sticky side of the adhesive tape is covered by a liner.

10. The dispenser according to claim 9, wherein a rotatably mounted draw-off roller is present and wrapped around, at least in part, by the adhesive tape and by means of which the adhesive tape is removed from the roll.

11. The dispenser according to claim 1, wherein at least the handle is mounted in a mirror-inverted manner on the frame such that the dispenser is usable by both left-handed and right-handed users.

12. The dispenser according to claim 1, further comprising:

a helical spring for pulling the lever back to an initial position.

13. The dispenser according to claim 1, wherein, when the dispenser is in an upright position, the second cutting apparatus is inclined with respect to the first cutting apparatus and located between the first cutting apparatus and the application device.

14. The dispenser according to claim 2, wherein the movable cutter is razor-blade-like cutter.

15. The dispenser according to claim 2, wherein the movable cutter comprises a toothed blade.

16. The dispenser according to claim 1, wherein the handle has a rear side located opposite with respect to the front side of the handle, wherein the rear side of the handle comprises a convex surface and a concave surface.

17. A dispenser for dispensing portions of a roll of a double-sided sticky adhesive tape, having at least one sticky side covered by a liner, the dispenser comprising:

a frame having an upper edge and a bottom edge, when the frame is located in an upright position;

a handle having a length defined between a first end and a second end located opposite to the first end of the handle, wherein the first end of the handle is fastened to the bottom edge of the frame, wherein the second end of the handle extends outwardly away from the bottom edge of the frame;

a movable lever connected to the frame;

a first cutting apparatus connected to the frame and configured such that, by way of a first cutting operation via moving the movable lever, the adhesive tape is weakened at a first point such that the adhesive tape is severable at the first point;

a second cutting apparatus connected to the frame and configured such that, by way of a second cutting operation via moving the movable lever, the adhesive tape and the liner are completely severed at a second point by the second cutting apparatus, wherein the second cutting apparatus is mounted downstream of the first cutting apparatus with reference to a guiding of the adhesive tape from the roll of the adhesive tape; and an application device by way of which the adhesive tape is pressed on a support, wherein the application device consists of a rotatably mounted roller, wherein the application device is connected to the frame of the dispenser and located downstream of the second cutting apparatus, that is mounted downstream of the first cutting apparatus, with reference to the guiding of the adhesive tape from the roll of the adhesive tape, and further wherein, when the dispenser is located in an upright position, the application device is inclined with respect to the first cutting apparatus and the second cutting apparatus, and further wherein the first cutting apparatus is located adjacent to the bottom edge, the second cutting apparatus is located adjacent to the top edge, and a portion of the application device is coplanar with the upper edge of the frame of the dispenser.

18. A dispenser for dispensing portions of a roll of a double-sided sticky adhesive tape, having at least one sticky side covered by a liner, the dispenser comprising:

a frame having an upper edge and a bottom edge when the frame is located in an upright position;

a handle having a length defined between a first end and a second end located opposite to the first end of the handle, wherein the first end of the handle is fastened to the bottom edge of the frame, wherein the second end of the handle extends outwardly away from the bottom edge of the frame;

a movable lever connected to the frame;

a first cutting apparatus connected to the frame and configured such that, by way of a first cutting operation via moving the movable lever, the adhesive tape is weakened at a first point such that the adhesive tape is severable at the first point;

a second cutting apparatus connected to the frame and configured such that, by way of a second cutting operation via moving the movable lever, the adhesive tape and the liner are completely severed at a second point by the second cutting apparatus, wherein the second cutting apparatus is mounted downstream of the first cutting apparatus with reference to a guiding of the adhesive tape from the roll of the adhesive tape; and an application device by way of which the adhesive tape is pressed on a support, wherein the application device consists of a rotatably mounted roller, wherein the movable lever extends outwardly away from the dispenser and has a length defined between a first end of the movable lever and a second end located opposite with respect to the first end of the movable lever, wherein the first end of the movable lever contacts the first cutting apparatus and the second end of the movable lever extends outwardly away from the upper edge of the frame when the movable lever is located in a first position.

* * * * *